(12) United States Patent
Masukake et al.

(10) Patent No.: US 10,711,689 B2
(45) Date of Patent: Jul. 14, 2020

(54) CONTROL DEVICE OF INTERNAL COMBUSTION ENGINE

(71) Applicant: Honda Motor Co., Ltd., Tokyo (JP)

(72) Inventors: Yuichi Masukake, Saitama (JP); Tetsuya Iida, Saitama (JP); Yujiro Tsutsumi, Saitama (JP); Ayumu Horiba, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 16/012,773

(22) Filed: Jun. 20, 2018

(65) Prior Publication Data

US 2019/0010863 A1     Jan. 10, 2019

(30) Foreign Application Priority Data

Jul. 4, 2017 (JP) ................................. 2017-130800

(51) Int. Cl.
    *F02B 37/16* (2006.01)
    *F02B 37/18* (2006.01)
    (Continued)

(52) U.S. Cl.
    CPC ............ *F02B 37/186* (2013.01); *F02B 37/16* (2013.01); *F02B 37/162* (2019.05); *F02B 37/18* (2013.01);
    (Continued)

(58) Field of Classification Search
    CPC ...... F02B 37/16; F02B 37/162; F02B 37/186; F02B 2037/125; F02B 37/18;
    (Continued)

(56) References Cited

U.S. PATENT DOCUMENTS

| 2011/0155108 | A1  | 6/2011 | Russ |
|---|---|---|---|
| 2015/0135706 | A1* | 5/2015 | Takao ..................... F02B 37/18 60/602 |

FOREIGN PATENT DOCUMENTS

| JP | H10288064    | 10/1998 |
|----|--------------|---------|
| JP | 2008008241   | 1/2008  |
| JP | 2013-249739  | 12/2013 |

OTHER PUBLICATIONS

"Office Action of Japan Counterpart Application," with English translation thereof, dated Mar. 5, 2019, p. 1-p. 4.
(Continued)

*Primary Examiner* — Audrey K Bradley
*Assistant Examiner* — Dapinder Singh
(74) *Attorney, Agent, or Firm* — JCIPRNET (57) ABSTRACT

A control device is provided capable of reliably preventing occurrence of a surging state by judging a possibility of the surging state in a relatively easy manner and promptly executing a surging state avoidance control. When a supercharging pressure decreasing state in which a target supercharging pressure decreases is detected, an operating speed of a wastegate valve is determined based on a detected engine rotational speed. That is, by lowering the operating speed as the engine rotational speed lowers, reduction in flow rate of the air passing through a compressor is prevented, and the occurrence of the surging state is reliably prevented. By lowering the operating speed instead of changing a target opening degree of the wastegate valve, a maximum opening degree of the wastegate valve can be suppressed, and responsiveness in the case where an acceleration request is made immediately after deceleration of an engine can be improved.

7 Claims, 4 Drawing Sheets

(51) Int. Cl.
  *F02D 41/00*   (2006.01)
  *F02D 23/00*   (2006.01)
  *F02B 37/12*   (2006.01)
  *F02D 41/14*   (2006.01)
  *F02D 31/00*   (2006.01)

(52) U.S. Cl.
  CPC ......... *F02D 23/00* (2013.01); *F02D 41/0007* (2013.01); *F02D 41/0097* (2013.01); *F02B 2037/125* (2013.01); *F02D 31/006* (2013.01); *F02D 41/1445* (2013.01); *F02D 41/1497* (2013.01); *F02D 2200/101* (2013.01)

(58) Field of Classification Search
  CPC ............. F02D 41/0097; F02D 41/0007; F02D 41/1497; F02D 41/1445; F02D 23/00; F02D 31/006; F02D 2200/101
  USPC .......................................................... 60/600
  See application file for complete search history.

(56) References Cited

OTHER PUBLICATIONS

"Office Action of China Counterpart Application" with English translation thereof, dated Apr. 10, 2020, p. 1-p. 10.

\* cited by examiner

CONTROL DEVICE OF INTERNAL COMBUSTION ENGINE

CROSS-REFERENCE TO RELATED APPLICATION

This application claims the priority benefit of Japan Application no. 2017-130800, filed on Jul. 4, 2017. The entirety of the above-mentioned patent application is hereby incorporated by reference herein and made a part of this specification.

BACKGROUND

Technical Field

The disclosure relates to a control device of an internal combustion engine provided with a supercharger, particularly to a control device which adjusts a flow rate of exhaust gas that drives a turbine of a supercharger to control a supercharging pressure.

Related Art

Japanese Laid-open Publication No. 2013-249739 shows a control device of an internal combustion engine provided with a supercharger. According to this control device, whether or not a compressor of the supercharger enters a surging state during vehicle deceleration is judged. When it is judged that the compressor enters the surging state, by controlling an opening degree of a nozzle vane varying a flow rate (hereinafter "turbine driving exhaust gas flow rate") of exhaust gas that drives a turbine of the supercharger to become equal to or greater than a target opening degree for surge avoidance, the surging state is avoided.

In the control device shown in Japanese Laid-open No. 2013-249739, it is judged that there is a possibility of the surging state when both an engine rotational speed and a supercharging pressure are equal to or higher than judgment threshold values during vehicle deceleration, and the surging state is avoided by setting the opening degree of the nozzle vane varying the turbine driving exhaust gas flow rate to equal to or greater than the target opening degree for surge avoidance.

However, no control is performed focusing on the process of changing the opening degree of the nozzle vane, and there is room for improvement to more properly execute a surging state avoidance control.

The disclosure provides a control device which reliably prevents occurrence of the surging state by judging the possibility of the surging state in a relatively easy manner and properly executing the surging state avoidance control.

SUMMARY

One embodiment of the disclosure provides a control device of an internal combustion engine. The control device of the internal combustion engine includes a supercharger having a compressor pressurizing air taken into the internal combustion engine, and a turbine connected to the compressor and rotationally driven by a kinetic energy of an exhaust gas of the internal combustion engine, and also includes an exhaust gas flow rate varying device varying a flow rate of the exhaust gas that drives the turbine. The control device includes a target supercharging pressure calculation member calculating a target supercharging pressure according to a target torque of the internal combustion engine, a rotational speed detection member detecting a rotational speed of the internal combustion engine, and a supercharging pressure control member determining an operating speed of the exhaust gas flow rate varying device based on the detected rotational speed of the internal combustion engine when a supercharging pressure decreasing state in which the target supercharging pressure decreases is detected.

Another embodiment of the disclosure provides a control device of an internal combustion engine. The control device of the internal combustion engine includes a supercharger having a compressor pressurizing air taken into the internal combustion engine, and a turbine connected to the compressor and rotationally driven by a kinetic energy of an exhaust gas of the internal combustion engine, and also includes an exhaust gas flow rate varying device varying a flow rate of the exhaust gas that drives the turbine. The control device includes a target supercharging pressure calculation member calculating a target supercharging pressure according to a target torque of the internal combustion engine, an intake air flow rate detection member detecting an intake air flow rate of the internal combustion engine, and a supercharging pressure control member determining an operating speed of the exhaust gas flow rate varying device based on the detected intake air flow rate of the internal combustion engine when a supercharging pressure decreasing state in which the target supercharging pressure decreases is detected.

DESCRIPTION OF THE EMBODIMENTS

According to a first embodiment, a control device of an internal combustion engine is provided. The internal combustion engine (1) includes a supercharger (12) having a compressor (123) pressurizing air taken into the internal combustion engine, and a turbine (121) connected to the compressor and rotationally driven by kinetic energy of exhaust gas of the internal combustion engine, and also includes an exhaust gas flow rate varying device (14) varying a flow rate of the exhaust gas that drives the turbine. The control device includes a target supercharging pressure calculation member calculating a target supercharging pressure (P2CMD) according to a target torque (TRQCMD) of the internal combustion engine, a rotational speed detection member detecting a rotational speed (NE) of the internal combustion engine, and a supercharging pressure control member determining an operating speed (VOP) of the exhaust gas flow rate varying device based on the detected rotational speed (NE) of the internal combustion engine when a supercharging pressure decreasing state in which the target supercharging pressure (P2CMD) decreases is detected.

According to this configuration, when the supercharging pressure decreasing state in which the target supercharging pressure decreases is detected, the operating speed of the exhaust gas flow rate varying device varying the turbine driving exhaust gas flow rate is determined based on the detected engine rotational speed. That is, since the operating speed of the exhaust gas flow rate varying device in a state in which it is necessary to promptly lower the supercharging pressure is determined based on the engine rotational speed, if there is a strong possibility that the surging state may occur, by lowering the operating speed, a sharp reduction in the flow rate of the air passing through the compressor is prevented, and the occurrence of the surging state can be reliably prevented. In addition, by lowering the operating speed (for example, an opening degree change rate of a wastegate valve) of the exhaust gas flow rate varying device instead of changing a target opening degree of the exhaust gas flow rate varying device, a maximum opening degree of the exhaust gas flow rate varying device can be suppressed, and responsiveness in the case where an acceleration request is made immediately after deceleration of the internal combustion engine can be improved.

According to a second embodiment, in the control device of the internal combustion engine of the first embodiment, the supercharging pressure control member executes an operating speed suppression control lowering the operating speed (VOP) as the rotational speed (NE) of the internal combustion engine lowers.

According to this configuration, since the surging state is more likely to occur as the rotational speed of the internal combustion engine lowers, the occurrence of the surging state can be reliably prevented by lowering the operating speed further.

According to a third embodiment, in the control device of the internal combustion engine of the second embodiment, the supercharging pressure control member sets the operating speed (VOP) to a maximum speed (VMAX) when the rotational speed (NE) of the internal combustion engine is equal to or higher than a predetermined rotational speed (NETH).

According to this configuration, when the rotational speed of the internal combustion engine is equal to or higher than the predetermined rotational speed, the operating speed is set to the maximum speed. By setting the predetermined rotational speed to a rotational speed at which the surging state reliably does not occur even if the operating speed is set to the maximum speed, there will be no need to lower the operating speed when the engine rotational speed is equal to or higher than the predetermined rotational speed. Accordingly, by setting the operating speed to the maximum speed, the responsiveness can be improved.

According to a fourth embodiment, in the control device of the internal combustion engine of the third embodiment, the supercharging pressure control member sets the operating speed (VOP) to a speed (VLNE) lower than the maximum speed (VMAX) when the rotational speed (NE) of the internal combustion engine is lower than the predetermined rotational speed (NETH).

According to this configuration, when the rotational speed of the internal combustion engine is lower than the predetermined rotational speed, there is a possibility that the surging state may occur. Thus, by setting the operating speed to the speed lower than the maximum speed, the occurrence of the surging state can be reliably prevented.

According to a fifth embodiment, in the control device of the internal combustion engine of the second or third embodiment, the internal combustion engine includes a compressor bypass passage (16) bypassing the compressor (123), and a bypass valve (17) provided in the compressor bypass passage, wherein the supercharging pressure control member maintains the bypass valve (17) in a valve-closed state when executing the operating speed suppression control.

According to this configuration, when the operating speed suppression control lowering the operating speed as the rotational speed of the internal combustion engine lowers is executed, the bypass valve provided in the compressor bypass passage is maintained in the valve-closed state. Although it is also possible to prevent the surging state from occurring by opening the bypass valve, since a defect may occur in which the supercharging pressure excessively lowers such that the responsiveness at the time of next acceleration deteriorates, by lowering the operating speed of the exhaust gas flow rate varying device and preventing the occurrence of the surging state, the occurrence of such defect can be avoided.

According to a sixth embodiment, a control device of an internal combustion engine is provided. The internal combustion engine (1) includes a supercharger having a compressor (123) pressurizing air taken into the internal combustion engine, and a turbine (121) connected to the compressor and rotationally driven by kinetic energy of exhaust gas of the internal combustion engine, and also includes an exhaust gas flow rate varying device (14) varying a flow rate of the exhaust gas that drives the turbine. The control device includes a target supercharging pressure calculation member calculating a target supercharging pressure (P2CMD) according to a target torque (TRQCMD) of the internal combustion engine, an intake air flow rate detection member detecting an intake air flow rate (GAIR) of the internal combustion engine, and a supercharging pressure control member determining an operating speed (VOP) of the exhaust gas flow rate varying device (14) based on the detected intake air flow rate (GAIR) of the internal combustion engine when a supercharging pressure decreasing state in which the target supercharging pressure (P2CMD) decreases is detected.

According to this configuration, when the supercharging pressure decreasing state in which the target supercharging pressure decreases is detected, the operating speed of the exhaust gas flow rate varying device varying the turbine driving exhaust gas flow rate is determined based on the detected intake air flow rate. That is, the operating speed of the exhaust gas flow rate varying device when the supercharging pressure is lowered to be equal to the target supercharging pressure is determined based on the intake air flow rate. Thus, the same effects as those of the first embodiment can be obtained.

Hereinafter, embodiments of the disclosure are explained with reference to the drawings.

Figure 1:
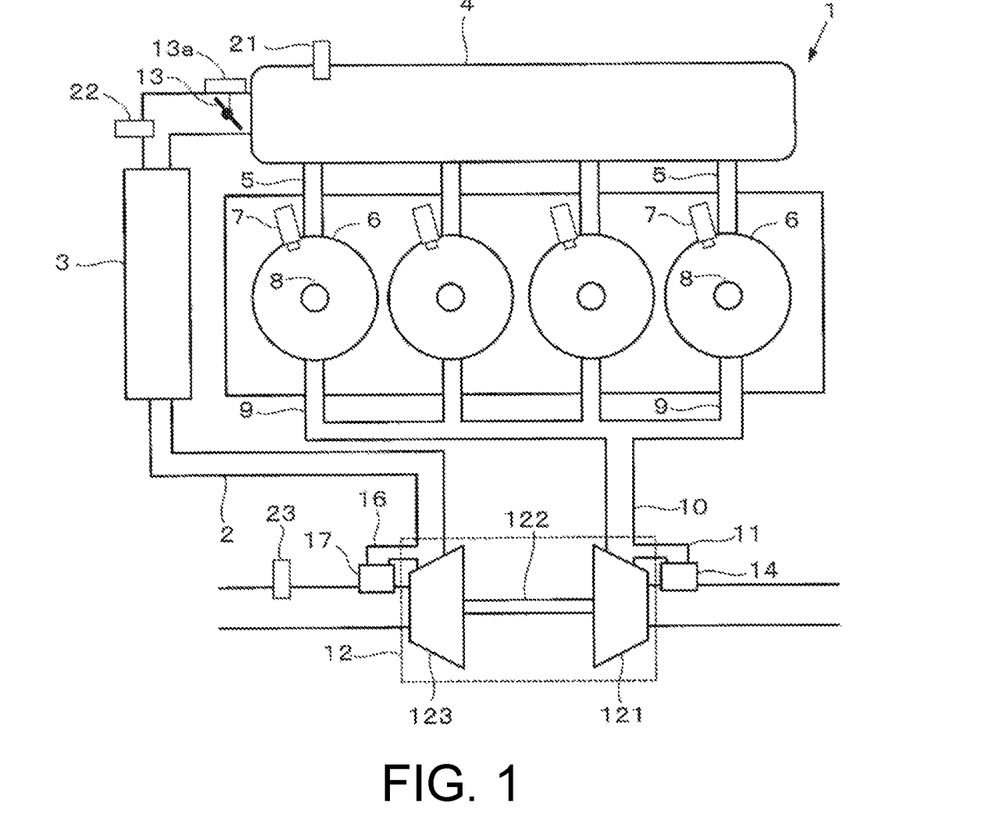
FIG. 1 schematically illustrates a configuration of an internal combustion engine according to an embodiment of the disclosure.

FIG. 1 schematically illustrates showing a configuration of an internal combustion engine (hereinafter "engine") according to an embodiment of the disclosure. An engine 1 is a direct injection engine having four cylinders 6 in which a fuel is directly injected into a combustion chamber of the cylinders 6. In each of the cylinders 6, an injector (INJ) 7, a spark plug (IG) 8, an intake valve (not illustrated) and an exhaust valve (not illustrated) are provided.

The engine 1 includes an intake passage 2, an exhaust passage 10 and a turbocharger (supercharger) 12. The intake passage 2 is connected to a surge tank 4, and the surge tank 4 is connected to the combustion chamber of each of the cylinders 6 via an intake manifold 5. In the intake passage 2, an intercooler 3 for cooling pressurized air and a throttle valve 13 are provided, wherein the throttle valve 13 is configured to be driven by a throttle actuator (THA) 13a. In the surge tank 4, an intake pressure sensor 21 detecting an intake pressure PBA is provided; on a downstream side of the intercooler 3 in the intake passage 2, a supercharging pressure sensor 22 detecting a supercharging pressure P2 is provided.

The turbocharger 12 includes a turbine 121 provided in the exhaust passage 10 and rotationally driven by kinetic energy of exhaust gas, and a compressor 123 connected to the turbine 121 via a shaft 122. The compressor 123 is provided in the intake passage 2 and performs pressurization (compression) of the air taken into the engine 1. A bypass passage 16 bypassing the compressor 123 is connected to the intake passage 2, wherein an air bypass valve (ABV) (hereinafter "AB valve") 17 being a flow rate regulating valve regulating a flow rate of the air passing through the bypass passage 16 is provided in the bypass passage 16. On an upstream side of the compressor 123 in the intake passage 2, an intake air flow rate sensor 23 detecting an intake air flow rate GAIR is provided.

The combustion chamber of each of the cylinders 6 of the engine 1 is connected to the exhaust passage 10 via an exhaust manifold 9. A bypass passage 11 bypassing the turbine 121 is connected to the exhaust passage 10, wherein a wastegate valve (WGV) (hereinafter "WG valve") 14 being a flow rate regulating valve regulating a flow rate of exhaust gas passing through the bypass passage 11 (in other words, the flow rate of the exhaust gas that drives the turbine 121) is provided in the bypass passage 11. In addition, although omitted from illustration, the engine 1 includes a well-known exhaust gas recirculation mechanism recirculating the exhaust gas to the intake passage 2.

Figure 2:
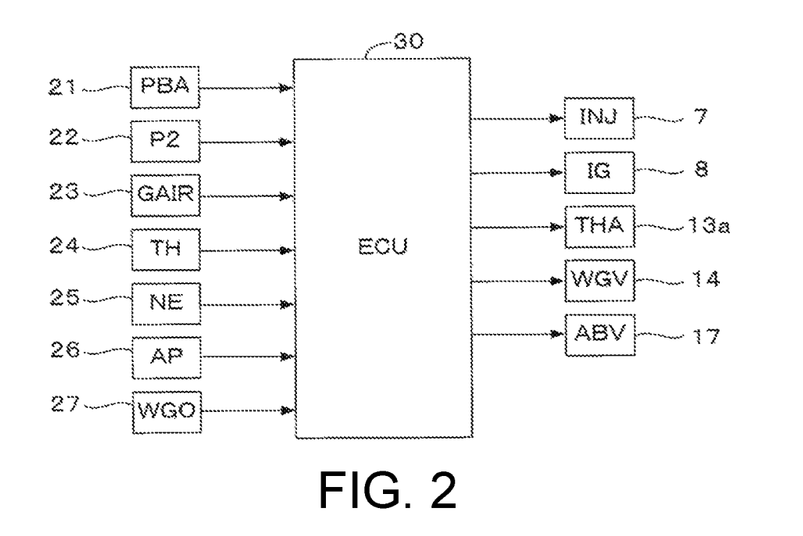
FIG. 2 is a block diagram showing a configuration of a control system performing a control of the internal combustion engine shown in FIG. 1.

FIG. 2 is a block diagram showing a configuration of a control system performing a control of the engine 1, wherein, in addition to the above-mentioned intake pressure sensor 21, supercharging pressure sensor 22 and intake air flow rate sensor 23, a throttle opening degree sensor 24 detecting an opening degree TH of the throttle valve 13, an engine rotational speed sensor 25 detecting a rotational speed NE of the engine 1, an accelerator sensor 26 detecting a depression amount (hereinafter "accelerator pedal operation amount") AP of an accelerator pedal (not illustrated) of a vehicle driven by the engine 1, a valve opening degree sensor 27 detecting atmospheric pressure PA, and other sensors not illustrated are connected to an electronic control unit (hereinafter "ECU") 30, and detection signals of these sensors are provided to the ECU 30. The injector 7, the spark plug 8, the throttle actuator 13a, the WG valve 14 and the AB valve 17 are connected to an output side of the ECU 30.

According to an engine operation state (mainly including the engine rotational speed NE and the target torque TRQCMD), the ECU 30 performs a fuel injection control by means of the injector 7, an ignition control by means of the spark plug 8, a turbine driving control by means of the WG valve 14, an intake air amount control by means of the throttle valve 13, and a compressor bypass control by means of the AB valve 17. The target torque TRQCMD is calculated mainly according to the accelerator pedal operation amount AP, and is calculated so as to increase as the accelerator pedal operation amount AP increases.

A fuel injection amount (mass) GINJ of the injector 7 is controlled by correcting a basic fuel amount GINJB, which is calculated according to a cylinder intake air amount GAIRCYL, by using a target equivalence ratio KCMD and an air-fuel ratio correction coefficient KAF corresponding to an air-fuel ratio AF detected by an air-fuel ratio sensor (not illustrated). The air-fuel ratio correction coefficient KAF is calculated so that the detected air-fuel ratio AF matches a target air-fuel ratio AFCMD. Moreover, the fuel injection amount GINJ is converted into a valve opening time TOUT of the injector 7 according to a fuel pressure PF, density of the fuel and so on, using a known method, and is controlled so that the amount of the fuel supplied into the combustion chamber per cycle is the fuel injection amount GINJ. In addition, an opening degree of the WG valve 14 is controlled so that the detected supercharging pressure P2 matches a target supercharging pressure P2CMD.

Figure 3:
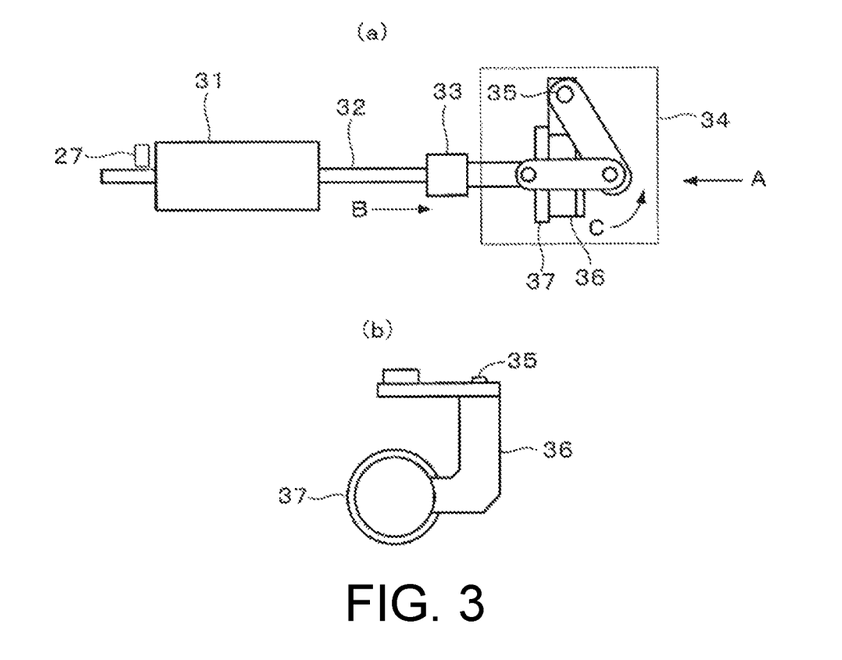
FIG. 3 schematically illustrates a driving mechanism driving a valve body of a wastegate valve (14) shown in FIG. 1.

FIG. 3 schematically illustrates a driving mechanism driving a valve body 37 of the WG valve 14, wherein the valve body 37 is driven to open or close by a motor 31, a rod 32, a heat shielding member 33 and a link mechanism 34. (b) of FIG. 3 is a drawing as viewed from the direction of arrow A in (a) of FIG. 3. The link mechanism 34 is configured in which a holding member 36 having the valve body 37 fixed thereto is rotatable about a rotary shaft 35.

(a) of FIG. 3 corresponds to a state in which the WG valve 14 is fully closed, i.e., a state in which the bypass passage 11 is blocked. When the motor 31 is rotationally driven, the rod 32 moves in a straight line direction shown by arrow B in (a) of FIG. 3, the holding member 36 and the valve body 37 rotate about the rotary shaft 35 of the link mechanism 34 as shown by arrow C, and the WG valve 14 is opened. A valve opening degree sensor 27 of the WG valve 14 is disposed in the vicinity of the rod 32, wherein the opening degree (hereinafter "WG opening degree") WGO of the WG valve 14 is detected by detecting a position of the rod 32 in the straight line direction (the direction of arrow B). An operating (valve opening and closing) speed VOP of the WG valve 14 can be easily changed by changing a rotational speed of the motor 31.

Moreover, in the present embodiment, the WG valve 14 is configured so as to open or close an opening portion of the bypass passage 11 which is opened to the exhaust passage 10 on a downstream side of the turbine 121. A driving mechanism (not illustrated) of the AB valve 17 is configured in the same manner, wherein the driving mechanism includes a motor driving the AB valve 17 to open or close, and a valve opening degree sensor detecting an opening degree of the AB valve 17.

Figure 4:
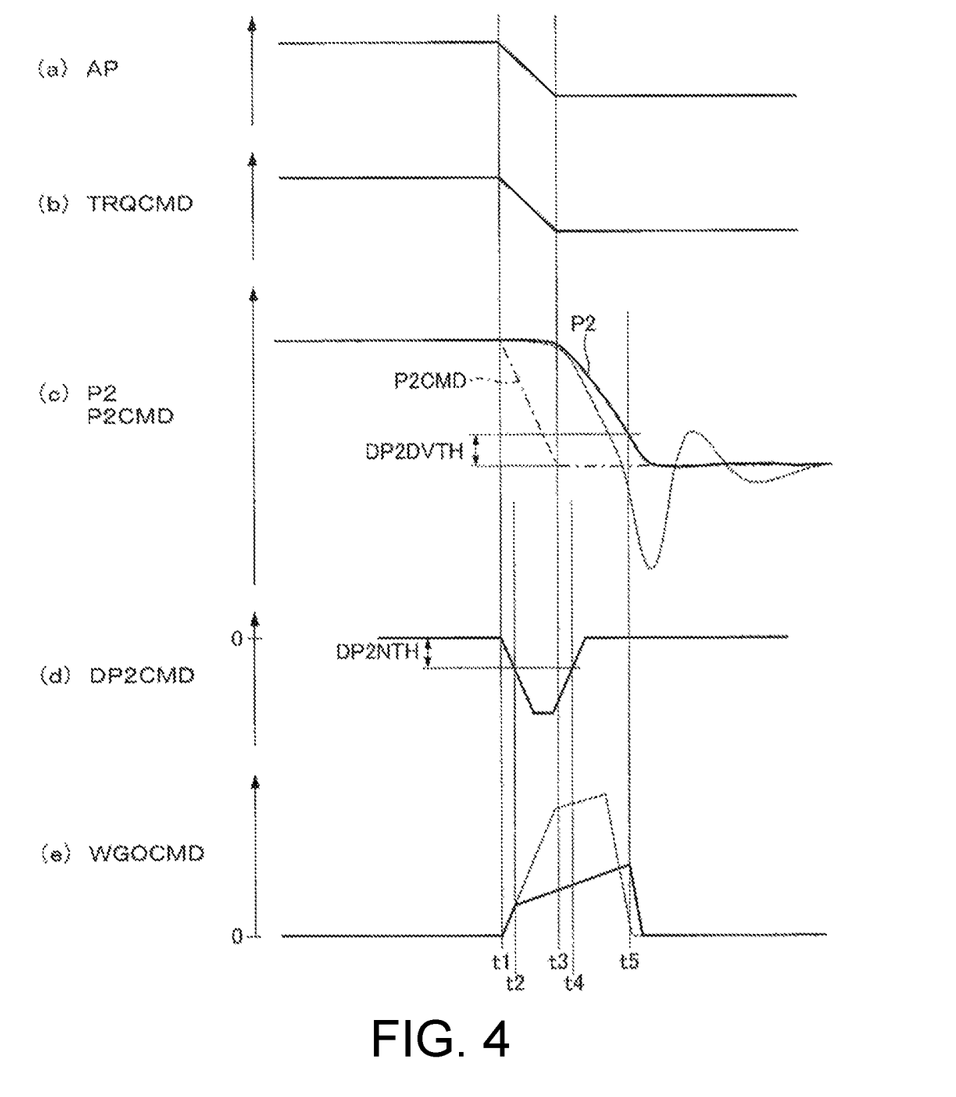
FIG. 4 is a time chart for explaining an outline of the disclosure.

FIG. 4 is a time chart for explaining an outline of the disclosure, wherein (a) to (e) of FIG. 4 respectively show transitions of accelerator pedal operation amount AP, target torque TRQCMD, supercharging pressure P2 (and target supercharging pressure P2CMD), target supercharging pressure change amount DP2CMD, and WG valve opening degree command value WGOCMD. A change rate (slope of the straight line) of the WG valve opening degree command value WGOCMD is equivalent to the operating speed VOP.

FIG. 4 shows an operation example in which the accelerator pedal operation amount AP decreases sharply during a short time from time t1 to time t3, and the target torque TRQCMD and the target supercharging pressure P2CMD (shown by a dot and dash line in (c) of FIG. 4) accordingly decrease sharply.

The target supercharging pressure change amount DP2CMD is a parameter showing a difference (=P2CMD(k)−P2CMD(k−kD)) between a current value P2CMD(k) of the target supercharging pressure and a past value P2CMD(k−kD) of the target supercharging pressure before a predetermined discrete time kD. A value greater than "1", for example "5", is set before the predetermined discrete time kD. By defining the target supercharging pressure change amount DP2CMD in this way, a continuous decrease in the target supercharging pressure P2CMD can be reliably captured.

The transitions of the supercharging pressure P2 and the WG valve opening degree command value WGOCMD shown in dashed lines respectively in (c) of FIG. 4 and (e) of FIG. 4 correspond to a case where the disclosure is not applied, wherein a control is performed to sharply (at relatively high speed) increase the WG valve opening degree command value WGOCMD with a decrease in the target supercharging pressure P2CMD, and the surging state occurs as shown in (c) of FIG. 4. It is confirmed that such phenomenon occurs notably in a state in which the engine rotational speed NE is relatively low.

Accordingly, in the present embodiment, when an absolute value of the target supercharging pressure change amount DP2CMD exceeds a decrease amount threshold value DP2NTH (time t2) and the engine rotational speed NE is lower than a predetermined rotational speed NETH (which is, for example, 2500 rpm), by executing an operating speed suppression control that sets an increase rate of the WG valve opening degree command value WGOCMD to a predetermined low speed VLNE lower than a maximum speed VMAX, a lowering speed of the supercharging pressure P2 is reduced, and the occurrence of the surging state is prevented. The predetermined rotational speed NETH is set to a rotational speed at which the surging state reliably does not occur even if the operating speed VOP is set to the maximum speed VMAX.

At time t5, at a time point when a control deviation (P2−P2CMD) being a difference between the supercharging pressure P2 and the target supercharging pressure P2CMD has become equal to or less than a deviation threshold value DP2DVTH, the operating speed suppression control is ended and the process returns to a normal control.

Moreover, a sharp decrease in the target supercharging pressure P2CMD as shown by the dot and dash line in (c) of FIG. 4 does not necessarily occur in the case where the accelerator pedal operation amount AP decreases sharply. The target supercharging pressure P2CMD similarly decreases sharply in the case where, for example, when a shift-up of an automatic transmission connected to an output shaft of the engine 1 is performed, a maximum supercharging pressure P2MAX (upper value of the supercharging pressure P2) lowers as the engine rotational speed NE lowers sharply. Accordingly, in such cases, by executing the above-mentioned operating speed suppression control of the WG valve 14, the occurrence of the surging state can also be prevented.

Figure 5:
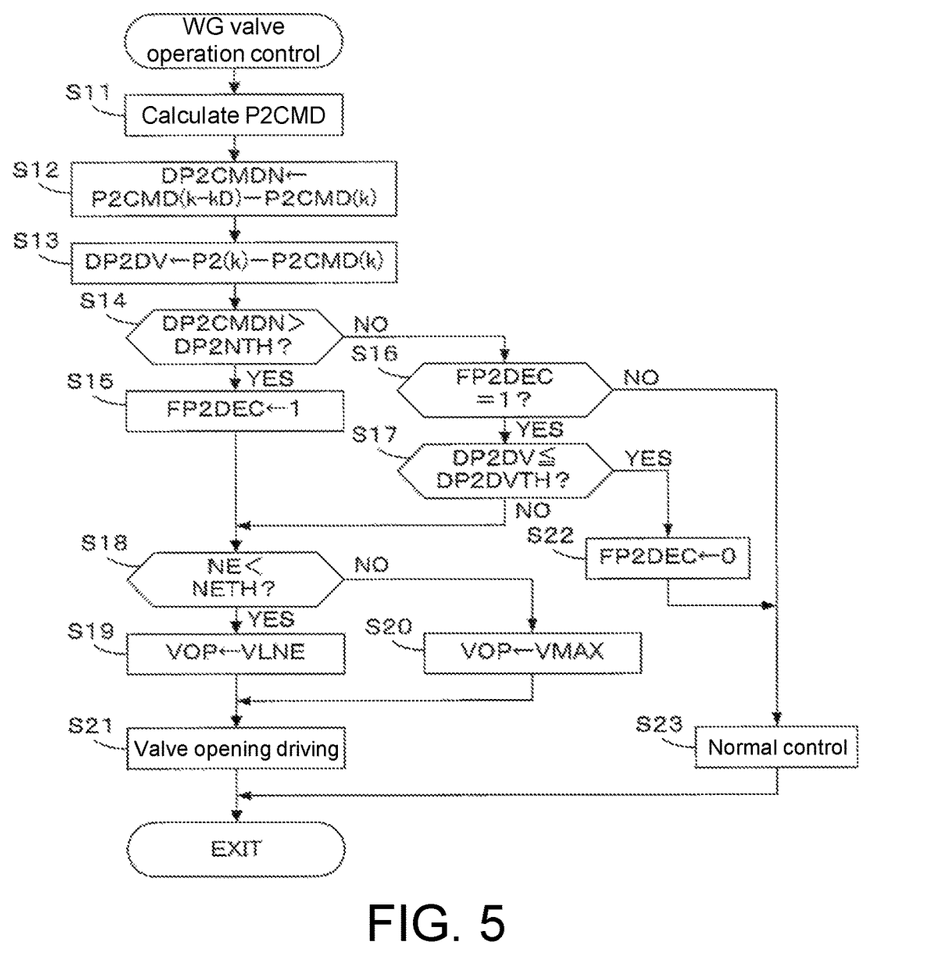
FIG. 5 is a flowchart of an operation control process of the wastegate valve (14).

FIG. 5 is a flowchart of an operation control process of the WG valve 14, the operation control process including the above-mentioned operating speed suppression control. This process is executed in the ECU 30 at predetermined time intervals.

In step S11, the target supercharging pressure P2CMD is calculated according to the engine rotational speed NE and the target torque TRQCMD. In step S12, a target supercharging pressure decrease amount DP2CMDN is calculated using the following equation (1). The target supercharging pressure decrease amount DP2CMDN is equivalent to a parameter obtained by inverting a sign of the target supercharging pressure change amount DP2CMD shown in (d) of FIG. 4, i.e., a parameter indicating a decrease rate of the target supercharging pressure P2CMD.

$$DP2CMDN=P2CMD(k-kD)-P2CMD(k) \qquad (1)$$

In step S13, a supercharging pressure control deviation DP2DV is calculated using the following equation (2).

$$DP2DV=P2(k)-P2CMD(k) \qquad (2)$$

In step S14, whether or not the target supercharging pressure decrease amount DP2CMDN is greater than the decrease amount threshold value DP2NTH is determined. The decrease amount threshold value DP2NTH is equivalent to a decrease rate threshold value for judging the magnitude of the decrease rate of the target supercharging pressure P2CMD. When the answer in step S14 is positive (YES), a speed suppression control flag FP2DEC is set to "1" (step S15), and whether or not the engine rotational speed NE is lower than the predetermined rotational speed NETH is determined (step S18). When the answer thereto is negative (NO), the operating speed VOP is set to the maximum speed VMAX (step S20), and a valve opening driving of the WG valve 14 is performed (step S21). When the answer in step S18 is positive (YES), the operating speed VOP is set to the predetermined low speed VLNE (step S19), and the process proceeds to step S21. The predetermined low speed VLNE is set to, for example, a value of 10% to 20% of the maximum speed VMAX.

When the answer in step S14 is negative (NO) (before time t2, and after time t4, in FIG. 4), the process proceeds to step S16 in which whether or not the speed suppression control flag FP2DEC is "1" is determined. When the answer thereto is positive (YES) (immediately after time t4), whether or not the supercharging pressure control deviation DP2DV is equal to or less than the deviation threshold value DP2DVTH is determined (step S17). At first, the answer thereto is negative (NO), and the process proceeds to step S18. Accordingly, when the operating speed suppression control is being executed, it is continuously executed.

If the answer in step S17 is positive (YES) (time t5 in FIG. 4), the speed suppression control flag FP2DEC is returned to "0" (step S22), and the process switches to the normal control (step S23). After that, since the answer in step S16 will be negative (NO), the normal control is executed.

Moreover, when the operating speed suppression control is executed, the AB valve 17 is controlled to be maintained in a valve-closed state.

As mentioned above, in the present embodiment, when a supercharging pressure decreasing state in which the target supercharging pressure P2CMD decreases at relatively high speed (DP2CMDN>DP2NTH) is detected, the operating speed VOP of the WG valve 14 varying the turbine driving exhaust gas flow rate is determined based on the detected engine rotational speed NE, i.e., the operating speed VOP of the WG valve 14 in a state in which it is necessary to promptly lower the supercharging pressure P2 is determined based on the engine rotational speed NE. Thus, if there is a strong possibility that the surging state may occur, by lowering the operating speed VOP, a sharp reduction in the flow rate of the air passing through the compressor 123 is prevented, and the occurrence of the surging state can be reliably prevented. In addition, by lowering the operating speed VOP instead of changing a target opening degree of the WG valve 14, a maximum opening degree of the WG valve 14 can be suppressed, and responsiveness in the case where an acceleration request is made immediately after deceleration of the engine 1 can be improved.

Specifically, when the engine rotational speed NE is equal to or higher than the predetermined rotational speed NETH, the operating speed VOP is set to the maximum speed VMAX; when the engine rotational speed NE is lower than the predetermined rotational speed NETH, the operating speed VOP is set to the predetermined low speed VLNE. Since the predetermined rotational speed NETH is set to the rotational speed at which the surging state reliably does not occur, when the engine rotational speed NE is equal to or higher than the predetermined rotational speed NETH, the responsiveness is improved by setting the operating speed VOP to the maximum speed VMAX; on the other hand, when the engine rotational speed NE is lower than the predetermined rotational speed NETH, the occurrence of the surging state is reliably prevented by setting the operating speed VOP to the predetermined low speed VLNE.

In addition, when the engine rotational speed NE is lower than the predetermined rotational speed NETH, when the operating speed suppression control lowering the operating speed VOP of the WG valve 14 is executed, the AB valve 17 provided in the bypass passage 16 bypassing the compressor 123 is maintained in the valve-closed state. Although it is also possible to prevent the surging state from occurring by opening the AB valve 17, since a defect may occur in which the supercharging pressure P2 excessively lowers such that the responsiveness at the time of next acceleration deteriorates, by lowering the operating speed VOP of the WG valve 14 and preventing the occurrence of the surging state, the occurrence of such defect can be avoided.

In the present embodiment, the WG valve 14 is equivalent to an exhaust gas flow rate varying device, the engine rotational speed sensor 25 is equivalent to a rotational speed detection member, and the ECU 30 constitutes a target supercharging pressure calculation member and a supercharging pressure control member.

Figure 6:
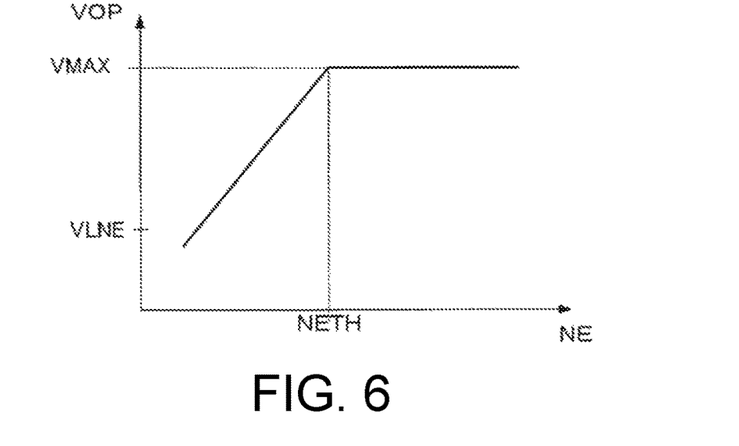
FIG. 6 shows a relationship between engine rotational speed (NE) and operating speed (VOP) of the wastegate valve.

Moreover, the disclosure is not limited to the above-mentioned embodiments, but may be modified in various ways. For example, the operating speed VOP of the WG valve 14 may be set as shown in FIG. 6 according to the engine rotational speed NE. In this modified example, when the engine rotational speed NE is lower than the predetermined rotational speed NETH, the operating speed VOP is set so as to lower as the engine rotational speed NE lowers.

In addition, in the above-mentioned embodiments, an operating state in which the surging state easily occurs may be judged according to the engine rotational speed NE. However, the operating state in which the surging state easily occurs may also be judged according to the intake air flow rate GAIR correlated to the engine rotational speed NE (flow rate of the air passing through the compressor 123). In such cases, by setting the operating speed VOP to the maximum speed VMAX when the detected intake air flow rate GAIR is equal to or greater than a predetermined flow rate GAIRTH, and lowering the operating speed VOP as the intake air flow rate GAIR lowers when the intake air flow rate GAIR is lower than the predetermined flow rate GAIRTH, the operating speed suppression control is executed.

In addition, in the above-mentioned embodiments, an example is shown in which the exhaust gas flow rate varying device varying the turbine driving exhaust gas flow rate is the WG valve 14. However, the exhaust gas flow rate varying device may also be constituted by a variable vane provided directly upstream of a turbine wheel and an actuator of the variable vane.

In addition, in the above-mentioned embodiments, an internal combustion engine having four cylinders is shown. However, the disclosure is applicable regardless of the number of cylinders of the internal combustion engine.

What is claimed is:

1. A control device of an internal combustion engine, comprising:
   a supercharger having a compressor pressurizing air taken into the internal combustion engine, and a turbine connected to the compressor and rotationally driven by a kinetic energy of an exhaust gas of the internal combustion engine, and
   an exhaust gas flow rate varying regulator varying a flow rate of the exhaust gas that drives the turbine,
   wherein the control device of the internal combustion engine further comprises:
   a hardware controller, configured to calculate a target supercharging pressure according to a target torque of the internal combustion engine; and
   a rotational speed detection sensor detecting a rotational speed of the internal combustion engine,
   wherein the hardware controller is further configured to determine an operating speed of the exhaust gas flow rate varying device based on the detected rotational speed of the internal combustion engine when a supercharging pressure decreasing state in which the target supercharging pressure decreases is detected.

2. The control device of the internal combustion engine according to claim 1, wherein the supercharging pressure control hardware controller is configured to execute an operating speed suppression control lowering the operating speed as the rotational speed of the internal combustion engine lowers.

3. The control device of the internal combustion engine according to claim 2, wherein the hardware controller is configured to set the operating speed to a maximum speed when the rotational speed of the internal combustion engine is equal to or higher than a predetermined rotational speed.

4. The control device of the internal combustion engine according to claim 3, wherein the hardware controller is configured to set the operating speed to a speed lower than the maximum speed when the rotational speed of the internal combustion engine is lower than the predetermined rotational speed.

5. The control device of the internal combustion engine according to claim 3, the internal combustion engine comprising a compressor bypass passage bypassing the compressor, and a bypass valve provided in the compressor bypass passage, wherein
   the hardware controller is configured to maintain the bypass valve in a valve-closed state when executing the operating speed suppression control.

6. The control device of the internal combustion engine according to claim 2, the internal combustion engine comprising a compressor bypass passage bypassing the compressor, and a bypass valve provided in the compressor bypass passage, wherein
   the hardware controller is configured to maintain the bypass valve in a valve-closed state when executing the operating speed suppression control.

7. A control device of an internal combustion engine, comprising:
   a supercharger having a compressor pressurizing air taken into the internal combustion engine, and a turbine connected to the compressor and rotationally driven by a kinetic energy of an exhaust gas of the internal combustion engine, and
   an exhaust gas flow rate varying regulator varying a flow rate of the exhaust gas that drives the turbine,
   wherein the control device of the internal combustion engine further comprises:

a hardware controller is configured to calculate a target supercharging pressure according to a target torque of the internal combustion engine; and an intake air flow rate detection meter detecting an intake air flow rate of the internal combustion engine; and wherein the hardware controller is further configured to determine an operating speed of the exhaust gas flow rate varying regulator based on the detected intake air flow rate of the internal combustion engine when a supercharging pressure decreasing state in which the target supercharging pressure decreases is detected.

* * * * *